United States Patent [19]

Maillefer

[11] 4,085,461
[45] Apr. 18, 1978

[54] SCREW-TYPE PLASTICS EXTRUDER

[75] Inventor: Charles E. Maillefer, Renens, Switzerland

[73] Assignee: Maillefer S.A., Switzerland

[21] Appl. No.: 692,751

[22] Filed: Jun. 4, 1976

[30] Foreign Application Priority Data

Jun. 30, 1975 Switzerland .................. 8486/75

[51] Int. Cl.² .............................................. B29F 3/02
[52] U.S. Cl. .................................... 366/90; 425/208; 425/378 R
[58] Field of Search ................ 259/191–193; 425/208, 378 R; 222/412; 100/145; 198/662, 676; 302/50; 264/176 R

[56] References Cited

U.S. PATENT DOCUMENTS

| 3,271,819 | 9/1966 | Lacher ................... 259/191 |
| 3,652,064 | 3/1972 | Lehnen et al. ............. 425/208 X |
| 3,867,079 | 2/1975 | Kim ....................... 425/208 |
| 3,941,535 | 3/1976 | Street ..................... 425/208 |

FOREIGN PATENT DOCUMENTS 942,014   2/1974   Canada ................... 425/208

*Primary Examiner*—J. Howard Flint, Jr.
*Assistant Examiner*—Mark Rosenbaum
*Attorney, Agent, or Firm*—Stevens, Davis, Miller & Mosher

[57] ABSTRACT

This invention is a screw-type extruder for plastics comprising a screw in a cylinder providing a feed zone, a plasticizing zone and a homogenization zone. The screw threads in the plasticizing zone are provided with marginal passageways so small as to provide heat exchange between the plastic and the screw, the latter being heated by friction.

11 Claims, 4 Drawing Figures

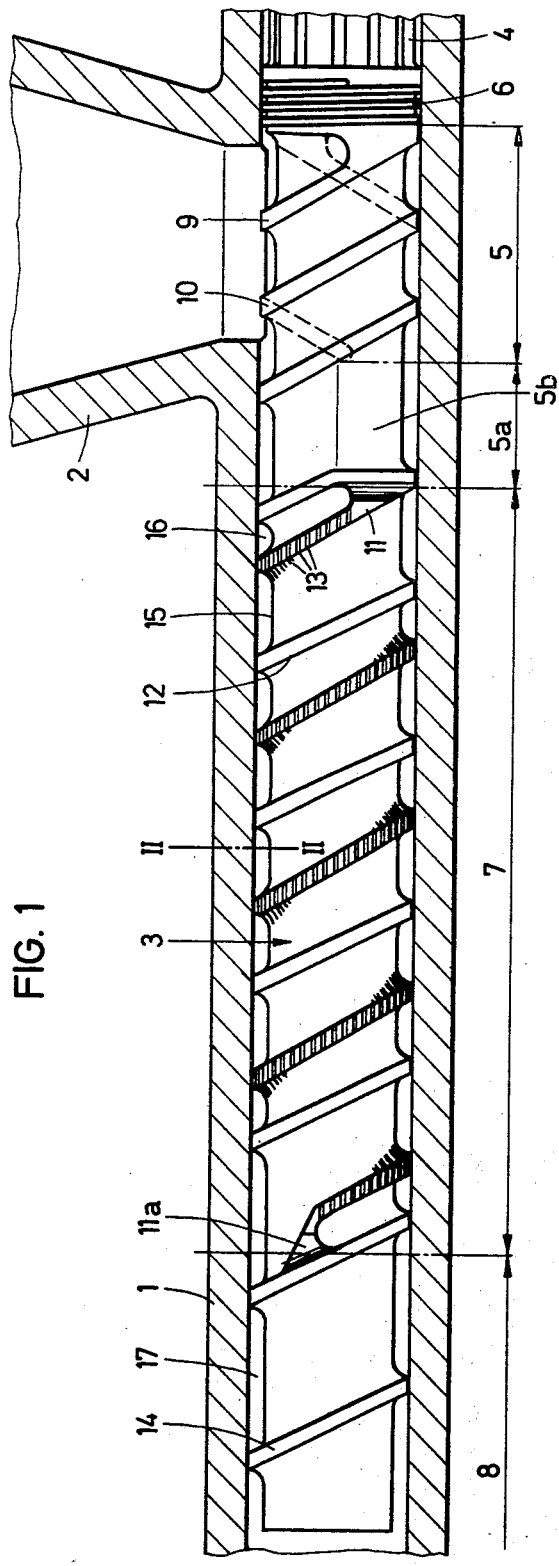
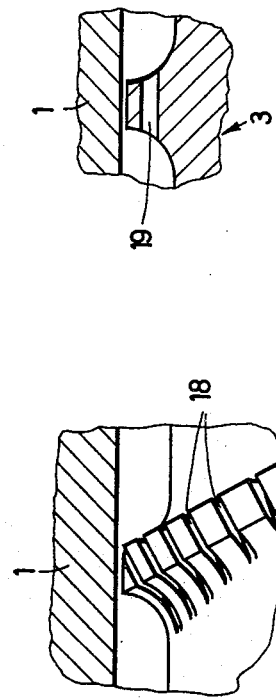
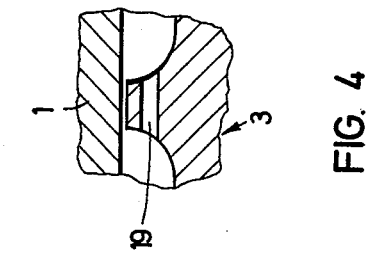
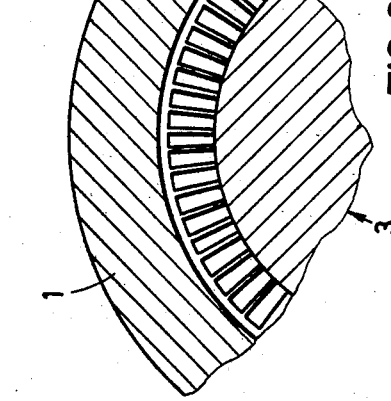

SCREW-TYPE PLASTICS EXTRUDER

This invention relates to extruders. More particularly, it relates to screw-type extruders for plastics.

As is well known, the function of a screw-type extruder is to transform a starting material, which is introduced into the hopper of the machine at ambient temperature in the form of pellets or powder, into a completely homogeneous plasticized mass at a specific temperature and to force this mass under a specific pressure and at a specific rate into the extrusion head connected to the exit orifice of the machine. Thus the screw must convey the material frm the entrance of the machine to the exit thereof while compressing it, must heat it to bring it into the desired state of plasticization, stir it up, and mix it to make it homogeneous. Many of the known extruders are divided along their length into a number of zones of differing structure specifically adapted to carry out each of these functions. Thus Swiss Pat. No. 363,149 discloses a screw having, within the plasticizing zone, two threads of constant but differing pitch delimiting an entrance channel of decreasing cross-section and an outlet channel of increasing cross-section. The larger-pitched thread is the so-called passing thread. Its summit extends along a helical line, the diameter of which is a few tenths of a millimeter less than the inside diameter of the cylinder, so that the material forced along by the downstream side of the passing thread upon rotation of the cylinder can pass, between the summit of the thread and the cylinder, from the entrance channel to the exit channel. This arrangement has proved very effective in ensuring complete plasticizing of the pellets and in eliminating the unmelted granules which were previously to be found in the final product.

Other screw designs are known having threads varying in number, height, pitch, or even profile along the screw. In certain cases, a helical channel defined by a thread is cut off at the level of the plasticizing zone by barrier elements provided with narrow passages. The material forced downstream by the rotation of the screw accumulates at these barriers, through which it passes only in a fluid state.

Extruder screw designs must satisfy not only the quality requirements mentioned above, resulting in homogeneity of the mass of plastic material arriving at the extrusion head, but also the ordinary requirements of economy, for it is important that an extruder of a given size be capable of forcing out the plastic material which it processes at as high a rate as possible. All other parameters being equal, the output of material forced along by a screw depends upon the speed of rotation of the screw; however, the various parameters are not independent, and particularly the heating of the material within the cylinder likewise depends upon the speed of rotation of the screw. It is due essentially to the friction of the plastic material, especially of pellets which have not yet reached their melting point, against the metal parts of the cylinder and the screw, as well as to internal friction resulting from the stirring of the pellets. Too high a speed of rotation leads to excessive localized heating, causing deterioration of the plastics. This represents the thermal limit of useful output. Practically speaking, the speed of rotation of a given screw processing a plastic material of given entry conditions is limited if a homogeneous mass of good quality is to be obtained at the exit. This represents the qualitative limit of useful output.

It is an object of this invention to provide a screw-type extruder for plastic materials of improved performance by increasing the output without any increase in size and simultaneously ensuring the requisite quality and homogeneity of the mass of plastic material reaching the extrusion head.

More specifically, it is an object of this invention to provide such an extruder in which the thermal and qualitative limits of useful output are raised.

To this end, in accordance with the present invention, there is provided an extruder for plastic materials, of the type wherein a screw housed within a cylinder is rottingly driven about its longitudinal axis at a predetermined speed and is divided along its length into at least three successive zones including a feed zone, a plasticizing zone, and a homogenization zone, and wherein the plasticizing zone is defined by one or more helical threads delimiting, together with the hub of the screw and the cylinder, one or more continuous channels for conveying the plastic material towards the exit of the extruder, in which the improvement comprises a plurality of narrow passages passing through at least one of the threads in the plasticizing zone and connecting the downstream side of that thread with the upstream side thereof.

Preferred embodiments of the invention will now be described in detail with reference to the accompanying drawing, in which:

FIG. 1 is a diagrammatic longitudinal section of a first embodiment.

FIG. 2 is a cross-section taken on the line II-II of FIG. 1, and

FIGS. 3 and 4 are partial sections of two other embodiments.

FIG. 1 illustrates an extruder comprising a cylinder 1 having a smooth inner surface, a hopper 2 at its upstream end, and an orifice (not shown) at its downstream end, connected to an extrusion head (not shown). The cylinder 1 might also have a grooved inner surface.

The cylinder 1 contains a screw 3, the upstream end of which is provided with coupling grooves 4 for attaching the screw 3 to a driving motor (not shown). Starting from its upstream end, the screw 3 is divided into three zones, viz., a feed zone 5, the upstream end of which is separated from the drive means by a gasket 6, a plasticizing zone 7, and a homogenization zone 8 which extends to the downstream end of the screw 3.

Between the feed zone 5 and the plasticizing zone 7 is an intermediate zone 5a, referred to as the transition zone.

In the feed zone 5, the threading of the screw 3 comprises two parallel threads 9 and 10. The feed zone 5 is situated beneath the hopper 2, and its function is to introduce the pellets of plastic material into the cylinder 1 while compressing them at a predetermined pressure, and to communicate to the mass of material contained in the machine a thrust ensuring its flow downstream. The transition zone 5a, into which only one of the two threads 9 and 10 continues, is provided for distributing the pellets in the entrance of the cylinder 1. It will be noted that in the transition zone 5a, the hub of the screw 3 is slightly larger in diameter than in the feed zone 5. Thus the hub presents a connecting surface between the zones 5 and 5a. The transition zone 5a is immediately followed by the plasticizing zone 7, in which the screw 3 comprises two threads 11 and 12 of constant but differing pitch. The thread 11 is the continuation of the thread 10 and has the same pitch, whereas the thread 12 has a smaller pitch. It originates in the upstream side of the thread 11 at the beginning of the zone 7, diverges gradually from the thread 11, then approaches the thread 11 once more so that at the end of the plasticizing zone 7, it rejoins the downstream side of the thread 11 after having described a path including one more turn. At the downstream end of the thread 11 is a groove 11a, the depth of which is somewhat less than the height of that thread. The thread 11 extends over at least two complete turns. Its upstream and downstream sides are inclined with respect to the cylindrical surface defining the hub of the screw 3.

The summit surface of the thread 11 is contained in an imaginary cylindrical surface coaxial with the screw 3 and smaller in diameter than the inner surface of the cylinder 1. The profile of the thread 12 is the same as that of the thread 11, i.e., both of its sides are inclinded with respect to the cylindrical surface of the hub of the screw 3. However, the thread 12 may be slightly higher or slightly lower than the thread 11, so that the clearance between the thread 12 and the cylinder 1 would be either less or more than the clearance between the passing thread 11 and the cylinder 1.

The passing thread 11 exhibits a plurality of slots 13 extending radially from the hub surface of the screw 3 to the summit surface of the thread 11. The radial slots 13 extend along planes containing the axis of the screw 3. Thus their traces on the surface of the hub are generatrices of that surface. The slots may range from about 0.8 to 1 mm in width. In one particular embodiment which has been the subject of extensive testing, and in which the screw was 80 mm. in diameter, there were sixty slots per turn, each 0.8 mm. in width. Hence the resultant total surface area of the cross-sectional areas of the slots represented about 20% of the total surface of the thread.

The passing thread 11 limits an entrance channel 15 on the upstream side and an exit channel 16 on the downstream side. The cross-section of the channel 15 gradually decreases to zero at the end of the plasticizing zone 7, while the cross-section of the channel 16 increases conversely and continues at the end of the plasticizing zone 7 into a homogenization channel 17 of uniform cross-section, limited by a thread 14.

The homogenization zone 8 comprises the single thread 14 of constant pitch, equal to that of the thread 12. The zone 8 is of conventional structure which need not be described in detail.

It has been found that the slots 13 described above produce a completely unexpected effect. Comparing two screws of the same structure except for the sole difference that the passing thread 11 of one of them comprises the slots 13, it would be logical to expect that the efficiency of the latter screw would be decreased because of lessened effectiveness of the thread 11 and that, consequently, the output of the extruder would be lower for a given speed of rotation than that of an extruder of the same size and rotating at the same speed with a completely solid thread 11. Yet tests have shown that the results obtained are completely opposite to that expectation, for the output of the extruder was increased by about 30%. Moreover, besides this increase in output, there was found to be less heating up, so that the exit temperature of the plastic material was lower in the extruder having passing slots than in the extruder having a solid passing thread. Tests have shown that it is possible to increase the speed of rotation of the screw, e.g., from 100 rpm to 120 rpm, without reaching temperatures which would be harmful to the plastic material, so that ultimately, the total increase in output obtainable was about 50%.

It has also been found that the presence of narrow passages connecting the upstream side of the thread with the downstream side in the plasticizing zone of an extruder screw increases the output of that extruder not only if, as shown in FIG. 1, these slots are made in the passing thread of a screw comprising two threads of constant but differing pitch, but also if passages are formed between the upstream and downstream sides of the thread 12 in the embodiment described, or in both threads 11 and 12. Even if one of the threads 11 or 12 is interrupted at its upstream or downstream end before rejoining the other thread, the increase in output due to the passages still exists. Nor is it necessary that the threads be different or even that there be more than one thread. In any helical thread driving the plasticized material downstream in a plasticizing zone of an extruder screw, the presence of numerous narrow passages directly connecting the downstream side of the thread with the upstream side causes an increase in output while at the same time improving the plasticizing.

Instead of the passages being radial slots 13 oriented along a generatrix of the screw hub, they may be slots 18 cut obliquely along helical lines (FIG. 3) or simple holes 19 extending through the thread (FIG. 4). Preferably, the size of the passages will be greater than the clearance between the screw and the cylinder, but their maximum size is governed by the size of the pellets. In the case of radial slots, they may extend all the way to the surface of the screw hub or only to an intermediate depth between the hub and the summit of the thread. What is important is to ensure that in the plasticizing zone, each pellet passes through the spaces provided, i.e., either the narrow passages or the clearance between the screw and the cylinder, thus achieving at least surface melting of the material and reduction of the pellets.

If the inner surface of the cylinder 1 is grooved, these grooves may spiral or may extend longitudinally over all or part of the zones 5a, 7, and 8.

To explain the effect of the passages described, it may be assumed that in an extruder such as that illustrated in FIG. 1, the threads 9 and 10 force the plastic material downstream. Now the incompletely plasticized material contained in the zone 7 opposes the downstream movement and hinders transmission of the pressure along the cylinder of the extruder.

Therefore, in order to increase the output of plastic material, it is desirable that the pellets be heated and plasticized as quickly as possible so as to reduce braking by friction. The increase in contact surface afforded by the presence of the slots or holes promotes the transfer of heat. Moreover, during operation of a screw such as that illustrated in the drawing, a relatively great amount of heat is emitted starting from the entrance to the cylinder when the pellets are still solid and consequently offer great resistance to movement. This emission of heat causes the metal parts to heat up, especially the hub of the screw, which may reach a temperature above the softening point of the plastic material, so that the screw heats up by conduction as far along as the plasticizing zone, where the metal reaches a temperature above the average temperature of the mass being plasticized. The numerous passages made in the passing thread enable each fragment of plastic material to remain in contact with or in immediate proximity to the metal of the screw and to be heated under the effect thereof during a longer period of time than if the only passage offered were the clearance between the passing thread and the cylinder. As a result, the plasticizing of the entire mass is hastened by the presence of the slots or holes, and the mass offers less resistance to advancement downstream. The pushing effect produced by the threads 9 and 10 causes a more effective flow, resulting in the increase in output noted, as well as in the lowering of the temperature which, in turn, makes it possible to increase the speed still further.

I claim:

1. In an extruder for plastic materials, of the type wherein a screw having a hub housed within a cylinder is rotatingly driven about its longitudinal axis at a predetermined speed and is divided along its length into at least three successive zones including a feed zone, a plasticizing zone and a homogenization zone, and wherein said plasticizing zone is provided with a helical thread of constant pitch integral with said hub and arranged for conveying said plastic material between said cylinder and said hub towards said homogenization zone, while said material plasticizes, said thread in said plasticizing zone having a multitude of narrow passages passing therethrough, each passage having a width less than its radial depth and in the range of from about 0.8 to 1 mm and connecting the downstream side of said thread with the upstream side thereof in such a manner that plastic material traverses said passages during its travel through the plasticizing zone, the passages thus providing for heating of the plastic material through surface contact with the thread.

2. An extruder in accordance with claim 1, wherein the radial depth of said slots is equal to the radial height of said thread.

3. An extruder in accordance with claim 1, wherein the depth of said slots is less than the radial height of said thread.

4. An extruder in accordance with claim 1 wherein said passages take the form of parallel slots extending radially into said thread and the number of said slots within each turn of said thread is about 60.

5. An extruder in accordance with claim 1, wherein said plasticizing zone is provided with an additional thread of constant but differing pitch, defining with said thread two channels, one channel being an entrance channel of decreasing cross-section and the other being an exit channel of increasing cross-section, and one thread being a passing thread.

6. An extruder in accordance with claim 5, wherein said additional thread also has narrow passages passing therethrough, each passage having a width less than its radial depth and connecting the downstream side of said thread with the upstream side thereof in such a manner that plastic material traverses said passages during its travel through the plasticizing zone, the passages thus providing for heating of the plastic material through surface contact with the thread.

7. An extruder in accordance with claim 5, wherein the peripheral clearance between said passing thread and said cylinder is greater than the clearance between said other thread and said cylinder, and wherein said narrow passages take the form of slots whose width is greater than the radial height of said clearance between said passing thread and said cylinder.

8. An extruder in accordance with claim 1, wherein said narrow passages take the form of holes passing through said thread.

9. An extruder in accordance with claim 1, wherein said narrow passages take the form of slots extending obliquely with respect to the generatrices of said hub of said screw.

10. An extruder in accordance with claim 1, wherein said narrow passages are distributed over at least two full turns of said thread.

11. In an extruder for plastic materials, of the type wherein a screw having a hub housed within a cylinder is rotatingly driven about its longitudinal axis at a predetermined speed and is divided along its length into at least three successive zones including a feed zone, a plasticizing zone and a homogenization zone, and wherein said plasticizing zone is provided with a helical thread of constant pitch integral with said hub and arranged for conveying said plastic material between cylinder and said hub towards said homogenization zone, while said material plasticizes, said thread in said plasticizing zone having a multitude of narrow passages passing therethrough, each passage having a width less than its radial depth and connecting the downstream side of said thread with the upstream side thereof in such a manner that plastic material traverses said passages during its travel through the plasticizing zone, the surface of the cross sectional areas of said narrow passages representing about 20% of the total surface area of said thread, said passages thus providing for heating of the plastic material through surface contact with the thread.

* * * * *